US008024166B2

(12) United States Patent
Chauvin et al.

(10) Patent No.: US 8,024,166 B2
(45) Date of Patent: Sep. 20, 2011

(54) METHOD OF ESTIMATING THE INSTANTANEOUS ENGINE SPEED PRODUCED BY EACH CYLINDER OF AN INTERNAL-COMBUSTION ENGINE

(75) Inventors: Jonathan Chauvin, Neuilly-sur-Seine (FR); Gilles Corde, Bois-Colombes (FR); Nicolas Petit, Sceaux (FR); Pierre Rouchon, Meudon (FR)

(73) Assignee: Institut Francais du Petrole, Cedex (FR)

( * ) Notice: Subject to any disclaimer, the term of this patent is extended or adjusted under 35 U.S.C. 154(b) by 606 days.

(21) Appl. No.: 12/067,523

(22) PCT Filed: Sep. 18, 2006

(86) PCT No.: PCT/FR2006/002127
§ 371 (c)(1),
(2), (4) Date: Sep. 2, 2008

(87) PCT Pub. No.: WO2007/034057
PCT Pub. Date: Mar. 29, 2007

(65) Prior Publication Data

US 2008/0319725 A1 Dec. 25, 2008

(30) Foreign Application Priority Data

Sep. 20, 2005 (FR) ...................................... 05 09624

(51) Int. Cl.
*G06F 9/455* (2006.01)

(52) U.S. Cl. ............................................ 703/6; 701/101

(58) Field of Classification Search ...... 703/6; 123/436, 123/300; 702/96; 701/101, 103, 110; 477/6, 477/13, 109
See application file for complete search history.

(56) References Cited

U.S. PATENT DOCUMENTS 5,658,217 A * 8/1997 Tsukada ........................ 477/109
(Continued)

FOREIGN PATENT DOCUMENTS

DE 100 17 107 A1 10/2001
(Continued)

OTHER PUBLICATIONS

Rizzoni et al., "Crankshaft position measurement for engine testing, control and diagnosis", IEEE 1989.*

(Continued)

*Primary Examiner* — Kandasamy Thangavelu
(74) *Attorney, Agent, or Firm* — Antonelli, Terry, Stout & Kraus, LLP.

(57) ABSTRACT

The invention is a method for real-time estimation of the instantaneous engine speed produced by each cylinder of an internal-combustion engine, from an instantaneous engine speed measurement at the end of the engine transmission system. A physical model, representing in real time the dynamics of the transmission system according to the crankshaft angle and to coefficients of a Fourier series decomposition of the instantaneous speed produced by each cylinder, is constructed. These coefficients are determined in real time from coupling between the model and an adaptive type nonlinear estimator. The instantaneous speed produced by each cylinder is then deduced from these coefficients. The mean torque produced by each cylinder can also be deduced therefrom. An application is: engine controls.

4 Claims, 2 Drawing Sheets

U.S. PATENT DOCUMENTS

| | | | | |
|---|---|---|---|---|
| 5,771,482 | A * | 6/1998 | Rizzoni | 701/101 |
| 5,775,299 | A * | 7/1998 | Ito et al. | 123/436 |
| 6,085,143 | A | 7/2000 | Przymusinski et al. | |
| 6,149,544 | A * | 11/2000 | Masberg et al. | 477/13 |
| 6,188,952 | B1 * | 2/2001 | Serra et al. | 701/103 |
| 6,363,318 | B1 * | 3/2002 | Wang et al. | 701/110 |
| 2001/0037792 | A1 * | 11/2001 | Moine et al. | 123/300 |
| 2003/0033076 | A1 * | 2/2003 | Isoda et al. | 701/110 |
| 2003/0167118 | A1 | 9/2003 | Rizzoni et al. | |
| 2004/0102913 | A1 * | 5/2004 | Hirn | 702/96 |
| 2005/0054480 | A1 * | 3/2005 | Ortmann et al. | 477/6 |

FOREIGN PATENT DOCUMENTS

| | | | |
|---|---|---|---|
| EP | 0 985 919 | A1 | 3/2000 |
| EP | 1 559 898 | A1 | 8/2005 |

OTHER PUBLICATIONS

Fejzo et al., “Adaptive nonlinear Wiener-Laguerre-Lattice models”, IEEE 1995.*

Krstic et al., “Adaptive non-linear controls with non-linear swapping”, IEEE, 1993.*

Trunov et al., “Automated fault diagnosis in nonlinear multivariable systems using a learning methodology”, IEEE 2000.*

* cited by examiner

METHOD OF ESTIMATING THE INSTANTANEOUS ENGINE SPEED PRODUCED BY EACH CYLINDER OF AN INTERNAL-COMBUSTION ENGINE

BACKGROUND OF THE INVENTION

1. Field of the Invention

The present invention relates to a method intended for real-time estimation of the instantaneous engine speed produced by each cylinder of an internal-combustion engine from the instantaneous speed detector located at the end of the transmission system.

2. Description of the Prior Art

Knowledge of the instantaneous speed for each cylinder allows estimation of the mean torque produced by each cylinder.

Estimation of the mean torque produced by each cylinder is important for all vehicles, whether equipped with gasoline or diesel engines. In the first case, it conditions good combustion of the mixture when the fuel/air ratio is close to 1, and therefore sensitive to cylinder to cylinder difference problems. In the second case, the knowing the torque allows readjustment so as to obtain optimum running conditions. Catalysts using a NOx trap lose efficiency in the course of time. In order to recover optimum efficiency, the torque of each cylinder has to be kept identical for some seconds, prior to returning to normal running conditions with a lean mixture. Removing pollution with DeNox catalysis therefore requires precise control of the torque cylinder by cylinder.

An instantaneous engine speed detector is therefore arranged at the end of the transmission system. This measurement is greatly distorted by the transmission and is affected by noise.

In order to control more precisely, and in particular individually, injection of the fuel masses into the cylinders, reconstruction of the torque cylinder to cylinder is necessary. Installing a digital torquemeter below each cylinder of a vehicle cannot be done considering the cost price thereof.

The method according to the invention provides an estimator, working from the measurement performed at the end of the transmission chain, to estimate the instantaneous engine speed below each cylinder.

SUMMARY OF THE INVENTION

The invention relates to a method for real-time estimation of the instantaneous engine speed produced by each cylinder of an internal-combustion engine comprising at least one transmission system connected to the cylinders and a detector performing real-time measurement ($x_1$) of the instantaneous engine speed at the end of the transmission system.

The method comprises:

a) constructing a physical model representing in real time the dynamics of the transmission system according to: the measurement ($x_1$), coefficients of a Fourier series representing decomposition of the instantaneous engine speed produced by each cylinder, and according to a damping and to a natural frequency of the transmission system;

b) determining, in real time, the coefficients of the Fourier series representing decomposition by coupling the model with an adaptive type non-linear estimator; and c) carrying out real-time estimation of the instantaneous engine speed produced by each cylinder from the Fourier coefficients.

The mean torque of each cylinder can also be estimated in real time from the estimation of these coefficients.

The method according to the invention can be applied to an engine control to control the fuel masses injected into each cylinder so as to adjust the mean torque produced by each cylinder.

BRIEF DESCRIPTION OF THE DRAWINGS

Other features and advantages of the method according to the invention will be clear from reading the description hereafter of embodiments given by way of non limitative example, with reference to the accompanying figures wherein.

DETAILED DESCRIPTION

Figure 1:
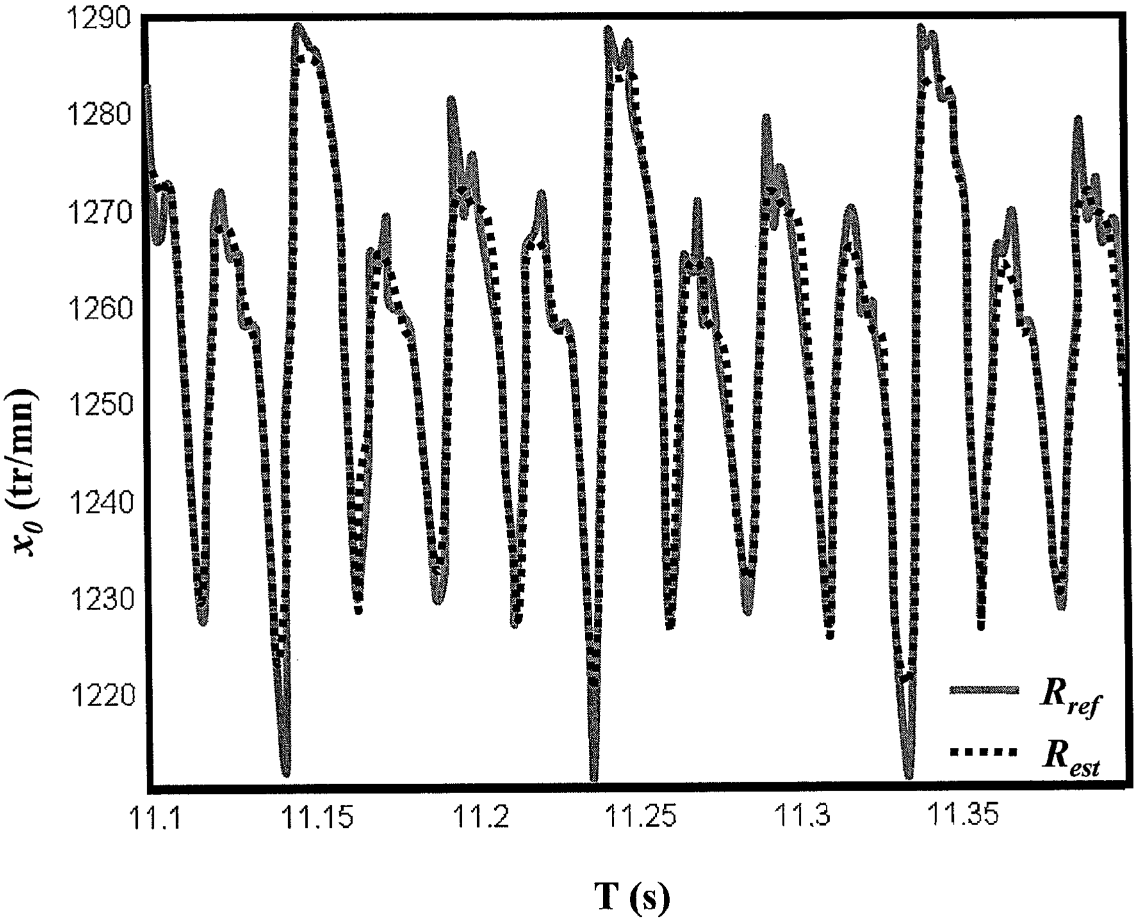
FIG. 1 illustrates the estimation of the instantaneous engine speed below the cylinders by means of the method according to the invention, on a working point of 1250 rpm at medium load.

The method according to the invention allows estimation of the instantaneous engine speed produced by each cylinder of an internal-combustion engine comprising at least one transmission system connected to the cylinders. At the end of this transmission system, a detector performs real-time measurement of the instantaneous engine speed. This signal is denoted by $x_1$. Measurement of the instantaneous engine speed below the cylinders, distorted by the drive shaft, is thus performed. The first stage of the invention thus is "reversing" the effects of the transmission to obtain the relevant information, that is the instantaneous engine speed produced by each cylinder. This relevant information is a periodic signal denoted by $x_0$.

The method mainly comprises:

1—Establishing, in an angular scale (that depending on the crankshaft angle and not on time), a physical model representing in real time the dynamics of the transmission system;

2—Describing the instantaneous engine speed produced by each cylinder by quasi time-invariant parameters such as the coefficients of the Fourier analysis of the instantaneous engine speed;

3—Coupling the physical model with an adaptive type non-linear estimator; and

4—Carrying out real-time estimation of the instantaneous engine speed produced by each cylinder from the adaptive type non-linear estimator.

1—Physical Model of the Transmission System Dynamics

To estimate signal $x_0$, that is the instantaneous engine speed below the cylinders, a physical model of the transmission system dynamics is first defined. Therefore, this system is considered to behave like a second-order system made up of two parameters:

$\overline{\omega}$: the natural frequency of the transmission in the rotating reference frame $\xi$: transmission damping.

Thus, considering the angular scale, the dynamics of the drive shaft is written as follows:

$$\begin{cases} \frac{d^2(x_1 - x_0)}{d\alpha^2} = -\xi\overline{\omega}\frac{d(x_1 - x_0)}{d\alpha} - \overline{\omega}^2(x_1 - x_0) \\ y = x_1 \end{cases}$$

with:

$x_1$: instantaneous engine speed at the end of the transmission chain: the measurement $x_0$: instantaneous engine speed below the cylinders which is the unknown $\overline{\omega}$: natural frequency of the transmission system in the rotating reference frame $\xi$: damping of the transmission system $\alpha$: crankshaft angle of the transmission system.

A variable change can be performed by putting:

$$w_0 = \frac{d^2 x_0}{d\,\alpha^2} + \xi\overline{\omega}\frac{dx_0}{d\alpha} + \overline{\omega}^2 x_0 \quad (1)$$

The instantaneous engine speed below the cylinders $x_0$ is periodic, therefore $w_0$ is also periodic. The dynamics can therefore be rewritten in the form as follows:

$$\begin{cases} \frac{dx}{d\alpha} = A \cdot x + A_0 \cdot w_0 \\ y = C \cdot x \end{cases} \quad (2)$$

with:

$$x = \begin{bmatrix} x_1 & \frac{dx_1}{d\alpha} \end{bmatrix}$$

$$A = \begin{bmatrix} 0 & 1 \\ -\overline{\omega}^2 & -\xi\overline{\omega} \end{bmatrix}$$

$$A_0 = \begin{bmatrix} 0 \\ 1 \end{bmatrix}$$

$$C = [1 \;\; 0]$$

This equation (2) is the physical model representing in real time the transmission system dynamics. An estimation of signal $w_0$ allows determination of an estimation of signal $x_0$ from equation (1).

2—Description of Signal $x_0$ by Quasi Time-Invariant Parameters

It is attempted to estimate, from this physical model and from measurement y (equal to $x_1$), signal $x_0$, that is the instantaneous engine speed produced by each cylinder. To perform this real-time estimation, the method according to the invention describes this signal $x_0$ with quasi time-invariant parameters. In other words, signal $x_0$ is defined by means of parameters which, at a given time, are constants. Therefore the fact is exploited that signal $x_0$ is mechanically periodic. Thus, instead of performing a highly variable signal estimation $x_0$, the Fourier coefficients of this signal can be estimated. It is also possible to use any parameter allowing description of signal $x_0$ in connection with the periodic character thereof. The Fourier coefficient analysis of signal $x_0$, developed into complex numbers for clarity reasons, is written as follows:

$$x_0(\alpha) = \sum_{j=-n}^{n} d_j e^{(i\omega\alpha)} \quad (3)$$

The $d_j$ represent the 2n+1 Fourier coefficients of the decomposition of signal $x_0$.

Thus, a signal is defined expressing the instantaneous engine speed $x_0$ according to the time-invariant parameters $d_j$.

To estimate parameters $d_j$, it is possible to use again variable change $w_0$ and to use the physical model described by system (2). Signal $w_0$ is also mechanically periodic, and its Fourier coefficient analysis, developed into complex numbers for clarity reasons, is written as follows:

$$w_0(\alpha) = \sum_{j=-n}^{n} c_j e^{(i\omega\alpha)}$$

The $c_j$ represent the 2n+1 Fourier coefficients.

Estimation of these coefficients $c_j$ thus allows estimation of the Fourier coefficient decomposition of signal $x_0$ and therefore signal $x_0$ itself.

Using only a finite number of harmonics ([−n;+n]), the physical model representing in real time the transmission system dynamics is then written as follows:

$$\begin{cases} \frac{dx}{d\alpha} = A \cdot x + A_0 \cdot \left( \sum_{j=-n}^{n} c_j e^{(i\omega\alpha)} \right) \\ \frac{dc_j}{d\alpha} = 0 \\ y = C \cdot x \end{cases}, \forall\, j \in [-n, n] \quad (4)$$

3—Coupling with an Adaptive Type Non-Linear Estimator

From the physical model described by system (4), an adaptive type non-linear estimator is defined comprising, on the one hand, a term linked with the dynamics and, on the other hand, a correction term:

$$\begin{cases} \frac{d\hat{x}}{d\alpha} = A \cdot \hat{x} + A_0 \cdot \sum_{j=-n}^{n} \hat{c}_j \cdot e^{(i\omega\alpha)} - L \cdot (C \cdot \hat{x} - y) \\ \frac{d\hat{c}_j}{d\alpha} = -e^{(-i\omega\alpha)} \cdot L_j \cdot (C \cdot \hat{x} - y),\ \forall\, j \in [-n, n] \end{cases} \quad (5)$$

with:

$\hat{x}$: estimator of x $\hat{c}_j$: estimator of $c_j$

L: a matrix to be calibrated $L_j$: matrices to be calibrated.

A selection of matrices L and providing convergence of the estimator is:

$$L = \begin{bmatrix} 2\xi\overline{\omega} \\ 2\overline{\omega}^2 \end{bmatrix} \text{ and } \forall\, j \in [-n, n]$$

$$L_j = \frac{1}{j^2 + 1}$$

The system of equations (5) represents an adaptive type non-linear estimator allowing estimation of coefficients $c_j$ of the Fourier coefficient analysis of the signal $w_0$.

This estimator (5) is constructed from variable change $w_0$, but it is clear that it is possible to construct in the same manner an adaptive type non-linear estimator directly from $x_0$.

4—Real-Time Estimation of the Instantaneous Engine Speed Produced by Each Cylinder It is then estimated, from estimation $\hat{c}_j$ of coefficients $c_j$, the instantaneous engine speed produced by each cylinder $x_0$.

Estimator (5) allows reconstruction of $w_0$ through its Fourier coefficients $c_j$. The goal is to reconstruct $x_0$. By means of the expression of $w_0$ given by equation (1), coefficients $d_j$ are expressed as a function of coefficients $c_j$.

$$d_j = \frac{\varpi^2 - (j\cdot\omega)^2 - i\cdot j\cdot\omega\cdot\xi\cdot\varpi}{(\varpi^2 - (j\cdot\omega)^2)^2 + (j\cdot\omega\cdot\xi\cdot\varpi)^2}\cdot c_j \quad \forall\, j \in [-n, n] \tag{6}$$

Thus the expression of the instantaneous engine speed produced by each cylinder, by means of equations (3) and (6), and the coefficients of its Fourier decomposition by means of equation (6) is obtained.

Estimation of the Mean Torque Produced by Each Cylinder

According to the invention, it is possible to provide an estimation of the mean torque produced by each cylinder from the estimation of the instantaneous engine speed produced by each cylinder ($x_0$) and more precisely from the estimation of its Fourier analysis into coefficients $d_j$.

Knowledge of the mean torque produced by each cylinder is fundamental and relevant information for combustion estimation; it is the image of the combustion that takes place in the engine.

The previous estimator (5) allows estimation of the signal of the engine speed below the cylinders as well as the Fourier analysis thereof. Now, the higher the torque, the higher the excitation on the shaft. It is thus possible to correlate the torque produced by the cylinder and the Fourier coefficients of the analysis of the instantaneous engine speed signal ($x_0$).

In general terms, it is thus possible to identify a function $\phi$ that allows determination of the MIP (Mean Indicated Pressure) or, in an equivalent manner, the mean torque from coefficients $d_j$.

$$\varphi: \begin{array}{ccc} R^{2n+1} & \to & R \\ \{d_j\} & \to & PMI \end{array}$$

This function $\phi$ can be a polynomial function. It can be determined empirically from tests. The following function $\phi$ can be selected for example:

$$\varphi(d_j) = \sum_{j=-n, j\neq 0}^{n} \frac{d_j^2}{\varphi_0} \tag{7}$$

with $\phi_0$ being a constant to be calibrated according to the engine speed used, by means of correlations with engine test bench measurements. This calibration can be carried out from a tabulation obtained from a linear optimization consisting in adjusting the value of $\phi_0$ so that the estimations are as close as possible to the engine parameters (parameters allowing engine calibration and provided by the manufacturer).

Results

FIG. 1 illustrates the estimation ($R_{est}$) of the instantaneous engine speed $x_0$ below the cylinders from the estimator according to the invention (5) described above on a working point of 1250 rpm at medium load. FIG. 1 also illustrates the reference instantaneous engine speed $R_{ref}$ (calculated from the cylinder pressure measurements on the engine test bench). A very good signal estimation is observed.

Figure 2:
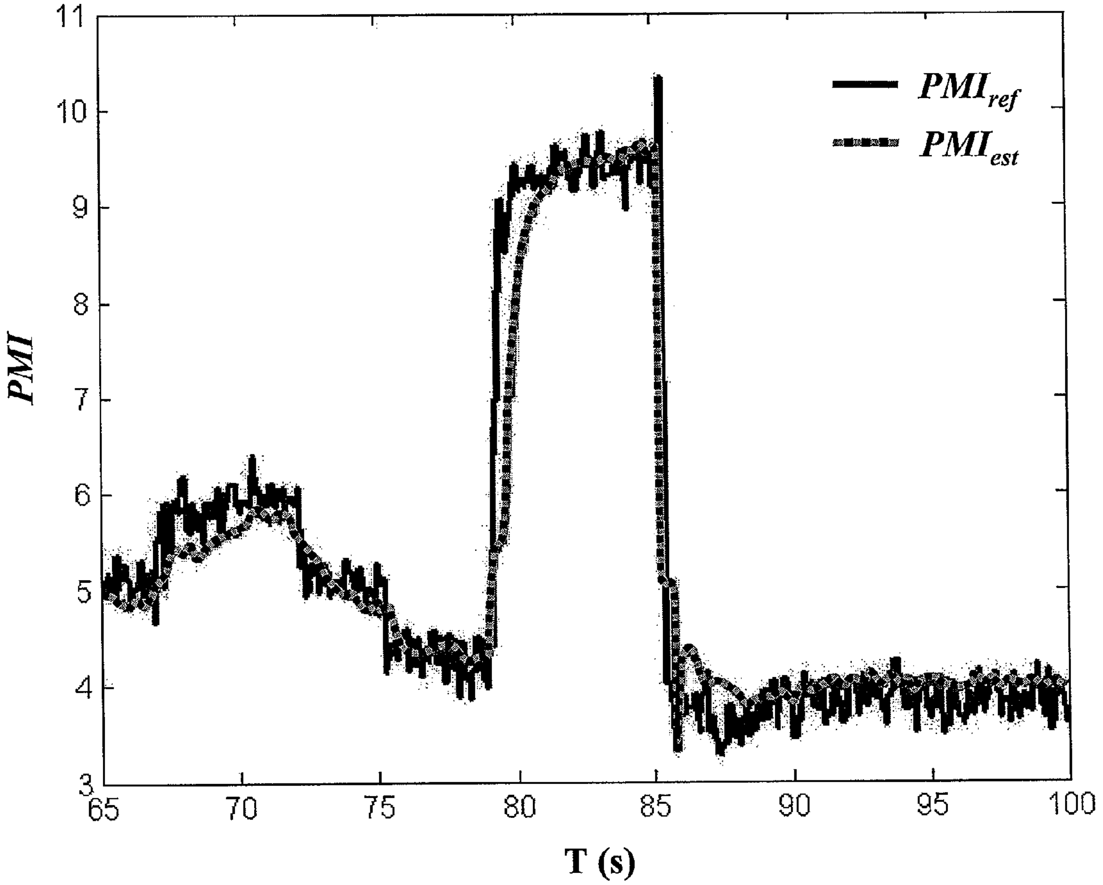
FIG. 2 illustrates the estimation of the mean torque cylinder to cylinder by means of the method according to the invention, on a working point of 1500 rpm.

FIG. 2 illustrates the estimation ($PMI_{est}$) of the torque cylinder to cylinder with a working point at 1500 rpm, from the estimator according to the invention (5) and a function $\phi$ defined by equation (7). FIG. 2 also illustrates the reference mean torque ($PMI_{ref}$) (calculated from the cylinder pressure measurements on the engine test bench). A very good signal estimation is observed.

The adaptive filter thus achieved is efficient and, in particular, it requires no additional adjustment in case of working point change. No identification stage is required, only a measurement noise and model adjustment has to be performed once.

An engine control can thus, from the reconstructed torques, adjust the fuel masses injected into each cylinder so that the torques are balanced in all the cylinders.

An estimation of the instantaneous engine speed produced by each cylinder and the estimation of the mean torque cylinder to cylinder have many advantages:

emissions reduction, improved driveability (delivered torque regulation), fuel consumption reduction, injection system diagnosis (detection of the drift of an injection nozzle or of the failure of the injection system).

The invention claimed is:

1. A method of real-time estimation of instantaneous engine speed produced by each cylinder of an internal-combustion engine including a crank shaft and at least one transmission system connected to the cylinders and a detector coupled to the transmission system performing real-time measurement of instantaneous engine speed comprising:

a) constructing a physical model, representing in real time, dynamics of the transmission system according to an angle of the crankshaft, measurement, coefficients of a Fourier series analysis of the instantaneous engine speed produced by each cylinder, and a damping and a natural frequency of the transmission system;

b) determining in real time the coefficients of the Fourier series analysis by coupling the model with an adaptive type-non-linear estimator; and c) carrying out real-time estimation of the instantaneous engine speed produced by each cylinder from the determined coefficients of the Fourier series analysis.

2. A method as claimed in claim 1, wherein mean torque of each cylinder is estimated in real time from an estimation of the coefficients.

3. The method as claimed in claim 2 comprising using the real-time estimation of the instantaneous engine speed to provide engine control to control fuel masses injected into each cylinder in order to adjust mean torque produced by each cylinder.

4. The method as claimed in claim 1 comprising using the real-time estimation of the instantaneous engine speed to provide engine control to control fuel masses injected into each cylinder in order to adjust mean torque produced by each cylinder.

* * * * *